US005690271A

United States Patent [19]
Dudel

[11] Patent Number: 5,690,271
[45] Date of Patent: Nov. 25, 1997

[54] PROCESS AND SOLDERING PASTE FOR SOLDERING ON LARGE-AREA PLATES OF ALUMINUM OR ALUMINUM ALLOYS AND USE OF THAT PROCESS

[75] Inventor: Klaus Dudel, St. Sulpice, Switzerland

[73] Assignee: Castolin S.A., Switzerland

[21] Appl. No.: 648,045

[22] PCT Filed: Aug. 4, 1994

[86] PCT No.: PCT/EP94/02581

§ 371 Date: Jun. 17, 1996

§ 102(e) Date: Jun. 17, 1996

[87] PCT Pub. No.: WO95/13902

PCT Pub. Date: May 26, 1995

[30] Foreign Application Priority Data

Nov. 19, 1993 [DE] Germany .................. 43 39 498.1

[51] Int. Cl.$^6$ .................................. B23K 35/363
[52] U.S. Cl. ................. 228/254; 228/224; 148/26
[58] Field of Search .................. 228/254, 224, 228/207, 262–243; 148/26

[56] References Cited

U.S. PATENT DOCUMENTS

| 4,151,016 | 4/1979 | Lee | 148/24 |
| 4,541,876 | 9/1985 | Hwang | 148/26 |
| 4,981,526 | 1/1991 | Kudo et al. | 148/25 |
| 5,226,974 | 7/1993 | Conn | 148/26 |
| 5,330,090 | 7/1994 | Iwai | 228/224 |

FOREIGN PATENT DOCUMENTS

| 0512489 | 11/1992 | European Pat. Off. |
| 2193676 | 2/1974 | France . |
| 8202014 | 6/1982 | WIPO . |

*Primary Examiner*—Samuel M. Heinrich
*Attorney, Agent, or Firm*—Bachman & LaPointe, P.C.

[57] ABSTRACT

In a process for soldering on large-area plates of aluminum or aluminum alloys on to a workpiece comprising an iron-base alloy, use is made of a soldering paste comprising a flux with about 50% potassium fluoride and about 50% aluminum fluoride, a solder powder with about 80 to 90% aluminum and 20 to 10% silicon and a binder on a polymethacrylate base. In addition the respective proportions of the flux are between 40 and 60% by weight, the solder powder between 60 and 40% by weight and the binder between 0.2 and 2% by weight.

8 Claims, No Drawings

PROCESS AND SOLDERING PASTE FOR SOLDERING ON LARGE-AREA PLATES OF ALUMINUM OR ALUMINUM ALLOYS AND USE OF THAT PROCESS

The invention concerns a process for soldering on large-area plates of aluminum or aluminum alloys on to a workpiece comprising an iron-base alloy. The invention also concerns the use of the process and a soldering paste which is suitable for carrying out the process.

Large-area solder joins between an aluminum or aluminum alloy plate and a bottom surface of a cooking pot of Inox—namely, stainless high-quality steel 18/8 Mo—have long been known. In those processes, in most cases the flux-solder powder mixture or the paste consisting thereof is sprinkled, coated or sprayed on to the surface to be soldered, and then introduced into the soldering installation and soldered.

In the case of all flux-solder layers which are applied using those known processes, the degree of stability in regard to abrasion wear and capability of being stored without being affected is very low, whereby the flux-solder layer suffers from damage which results in defects in the soldering, locations which are not properly soldered, or included flux residues.

In consideration of that state of the art, the inventor set himself the aim of eliminating the recognised deficiencies and improving the process of the kind set forth in the opening part of this specification in particular in respect of the soldering operation and the storage or transportation capability.

That object is attained by the teaching set forth in the independent claim. The appendant claims set forth desirable developments.

In accordance with the invention for soldering on the plate, use is made of a soldering paste which on the one hand comprises a flux with approximately half proportions of potassium fluoride (KF) and aluminum fluoride ($AlF_3$) respectively, and on the other hand a solder powder with about 80 to 90% aluminum and 20 to 10% silicon and also a binder on a polymethacrylate base, wherein the preferred proportions of the flux should be between 40 and 60% by weight, solder powder between 60 and 40% by weight, and binder between 0.2 and 2% by weight, in particular 0.3 to 1.2% by weight.

A further feature of the invention provides for using a binder comprising a monopropylene glycol and 10 to 30% by weight and preferably 20 to 25% by weight of a solution of butyl methacrylate and a mixture of aliphatic and naphthenic hydrocarbons ($C_7$ to $C_9$); the proportion of monopropylene glycol is added to the soldering paste, but not the solution.

The bonding of the individual particles to each other and to the surface of the aluminum plate is substantially improved and their storage and despatch capabilities are increased by virtue of the resinlike butyl methacrylate.

The butyl methacrylate is dissolved in various solvents depending on the choice of the kind of spray procedure for application in one or in two working operations.

If the layer is applied to the aluminum plate in two working operations, the paste which is sprayed on first comprises flux, solder and monopropylene glycol. The solution which is sprayed on then—in the second working operation—is sprayed on with 10 to 30% by weight and preferably 20 to 25% by weight of butyl methacrylate, dissolved in aliphatic and naphthenic hydrocarbons. In accordance with the stated object the suitability for storage and the despatch capability are enhanced by virtue of the very thin resin film which is formed in that case.

If the layer is to be applied in one working operation, the butyl methacrylate solution is produced in the same ratio—only with another solvent—and mixed with the paste before the spraying-on operation.

In that case, glycol ethers, glycol esters or ketones and to a very slight degree also glycol ether acetates are used as solvent for the butyl methacrylate, as a mixture or each individually.

When using that paste in one working operation the same properties are achieved for the coating, as in the case of the coating which is produced in two working operations.

In the investigations it was also found that the resin-like additives according to the invention do not have any disturbing influences on the soldering procedure.

Further advantages, features and details will be apparent from the following description of preferred embodiments.

EXAMPLE 1

To improve the transfer of heat into a cooking pot of Inox, an aluminum plate was to be soldered on to the bottom thereof.

The paste comprising flux, solder and monopropylene glycol in accordance with claim 7 and claim 9 was sprayed with a paint spray gun on to the prepared surface, which was to be soldered, of the aluminum plate. After the drying operation, a thin layer of the 20 to 25% by weight butyl methacrylate solution was sprayed on to that layer with the same spray gun, and then dried.

The plate produced and coated in that way was now stored and, after a storage time of 3 to 4 days, transported to the soldering press for the purposes of carrying out the soldering operation.

No defects such as abrasion wear or scaling-off could be found in the soldering paste coating, in the checking operation prior to the soldering operation. The soldered cooking pots also did not exhibit any defects.

EXAMPLE 2

Unlike the procedure set forth in Example 1 the butyl methacrylate solution was mixed into the flux-solder paste.

For checking the suitability for transportation, a chest or box with coated aluminum plates was transported for several hours in a truck, for checking suitability for transportation.

In the checking operation which was carried out thereafter, it was not possible to detect any damage due to being transported. In this case also no defects could be found on the soldered pots, after the soldering operation.

I claim:

1. A process for the production of large-area plates of aluminum or aluminum alloys for fixing same on a workpiece comprising an iron-base alloy, for example an aluminum plate which is a good conductor of heat on the bottom of a cooking pot of stainless high-quality steel using a powder containing aluminum and silicon, and a flux with potassium and aluminum fluoride, characterized in that the plate is provided with a soldering paste of flux with about 50% potassium fluoride and about 50% aluminum fluoride, a solder powder with about 80 to 90% aluminum and 20 to 10% silicon and a binder comprising a monopropylene glycol, 10 to 30% by weight of a solution of butyl methacrylate and glycol ethers, glycol esters, ketones, in each case individually or in the form of a mixture, wherein the proportion of the binder is between 0.2 and 2% by weight, whereafter the coated plate is dried and aged.

2. A process for the production of large-area plates of aluminum or aluminum alloys for fixing same on a workpiece comprising an iron-base alloy, for example an aluminum plate which is a good conductor of heat on the bottom of a cooking pot of stainless high-quality steel using a powder containing aluminum and silicon, and a flux with potassium and aluminum fluoride, characterized in that the plate is provided with a soldering paste comprising flux with about 50% potassium fluoride and about 50% aluminum fluoride, a solder powder with about 80 to 90% aluminum and 20 to 10% silicon and a binder comprising a monopropylene glycol, 10 to 30% by weight of a solution of butyl methacrylate and a mixture of aliphatic and naphthenic hydrocarbons ($C_7$ to $C_9$), wherein the proportion of the binder is between 0.2 and 2% by weight, whereafter the coated plate is dried and aged.

3. A process as set forth in claim 2 characterized in that the soldering paste which is sprayed on to the plate with a spray gun is then fixed by spraying on the binder solution in a second working operation.

4. A process as set forth in claim 1 characterized in that additives of up to at most 5.0% by weight of glycol ether acetates are added to the binder.

5. A process as set forth in claim 1 characterized by a proportion of the flux of between 40 and 60% by weight, the solder powder between 60 and 40% by weight and/or the binder between 0.3 and 1.2% by weight.

6. A process as set forth in claim 1 characterized by a binder with 20 to 25% by weight of the solution of butyl methacrylate.

7. A process as set forth in claim 1 characterized in that the proportion of monopropylene glycol is added to the solder paste.

8. A process as set forth in claim 1 characterized in that the soldering paste is sprayed on to the plate with a spray gun.

* * * * *